(12) United States Patent
Daniels

(10) Patent No.: US 8,910,920 B1
(45) Date of Patent: Dec. 16, 2014

(54) SHUTTER VALVE WITH PIVOT ARMS

(71) Applicant: Kyle P Daniels, Coral Gables, FL (US)

(72) Inventor: Kyle P Daniels, Coral Gables, FL (US)

(*) Notice: Subject to any disclaimer, the term of this patent is extended or adjusted under 35 U.S.C. 154(b) by 0 days.

(21) Appl. No.: 14/462,047

(22) Filed: Aug. 18, 2014

Related U.S. Application Data

(63) Continuation-in-part of application No. 14/454,265, filed on Aug. 7, 2014.

(60) Provisional application No. 61/863,179, filed on Aug. 7, 2013.

(51) Int. Cl.
| | |
|---|---|
| *F16K 3/00* | (2006.01) |
| *F16K 3/03* | (2006.01) |
| *F16K 3/18* | (2006.01) |
| *F16K 3/02* | (2006.01) |
| *F16K 31/53* | (2006.01) |

(52) U.S. Cl.
CPC ... *F16K 3/03* (2013.01); *F16K 3/18* (2013.01); *F16K 3/0227* (2013.01); *F16K 31/535* (2013.01)
USPC .......................... 251/212; 251/248; 123/188.1

(58) Field of Classification Search
CPC ..... F16K 3/03; F16K 31/53; F02M 2700/4323
USPC .......... 251/212, 248; 123/188.1, 190.1, 190.8
See application file for complete search history.

(56) References Cited

U.S. PATENT DOCUMENTS

| | | | | |
|---|---|---|---|---|
| 1,343,477 A * | 6/1920 | Roades | ................. | 137/385 |
| 1,595,300 A * | 8/1926 | Halloran | ................. | 251/250.5 |
| 1,999,699 A * | 4/1935 | Koch | ................. | 251/1.3 |
| 2,043,337 A * | 6/1936 | Smith | ................. | 251/149 |
| 2,307,273 A * | 1/1943 | Hughes | ................. | 251/212 |
| 3,329,396 A * | 7/1967 | Heaton et al. | ................. | 251/212 |
| 3,787,022 A * | 1/1974 | Wilcox | ................. | 251/212 |
| 4,094,492 A * | 6/1978 | Beeman et al. | ................. | 251/212 |
| 4,232,595 A * | 11/1980 | Cox | ................. | 454/29 |
| 5,806,725 A * | 9/1998 | Bennett | ................. | 222/503 |
| 7,819,728 B2 * | 10/2010 | Beckley | ................. | 454/155 |
| 8,132,783 B2 * | 3/2012 | Luebbers | ................. | 251/212 |
| 8,430,140 B2 * | 4/2013 | Ognjanovski et al. | ................. | 141/350 |
| 2009/0025416 A1 * | 1/2009 | Murakami et al. | ................. | 62/324.6 |
| 2014/0124061 A1 * | 5/2014 | Daniel | ................. | 137/505 |

FOREIGN PATENT DOCUMENTS

| | | | |
|---|---|---|---|
| FR | 1147940 A | * | 12/1957 |
| GB | 579471 A | * | 8/1946 |

* cited by examiner

*Primary Examiner* — Marina Tietjen
(74) *Attorney, Agent, or Firm* — Mark Terry

(57) ABSTRACT

A shutter valve for regulating pressure and controlling fluid flow comprising: an actuator ring comprising a plurality of gear teeth, the gear teeth driven by a mating gear; a plurality of arm pin bosses, each pin boss affixed within an inside circumference of the actuator ring, each arm pin boss further comprising a hinge pin aperture; three or more pivot arms, each pivot arm having a first end and a second end, the first end forming a hinge and mounted to a hinge pin aperture of an arm pin boss; three or more obturator elements; and a housing defining a cavity for holding the actuator ring, the pivot arms and the obturator elements.

19 Claims, 9 Drawing Sheets

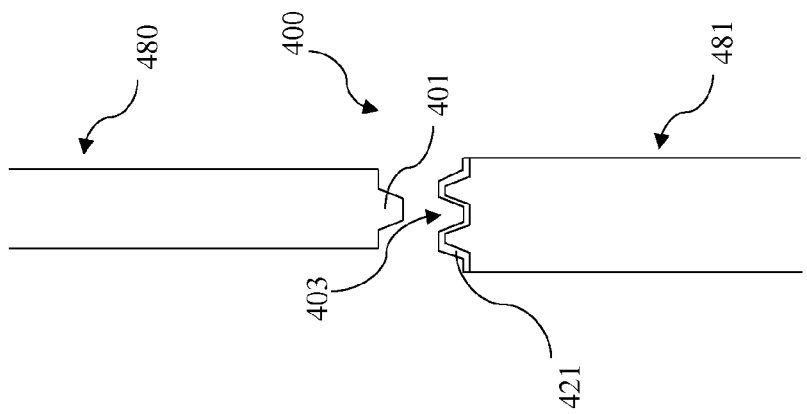
Figure 4C
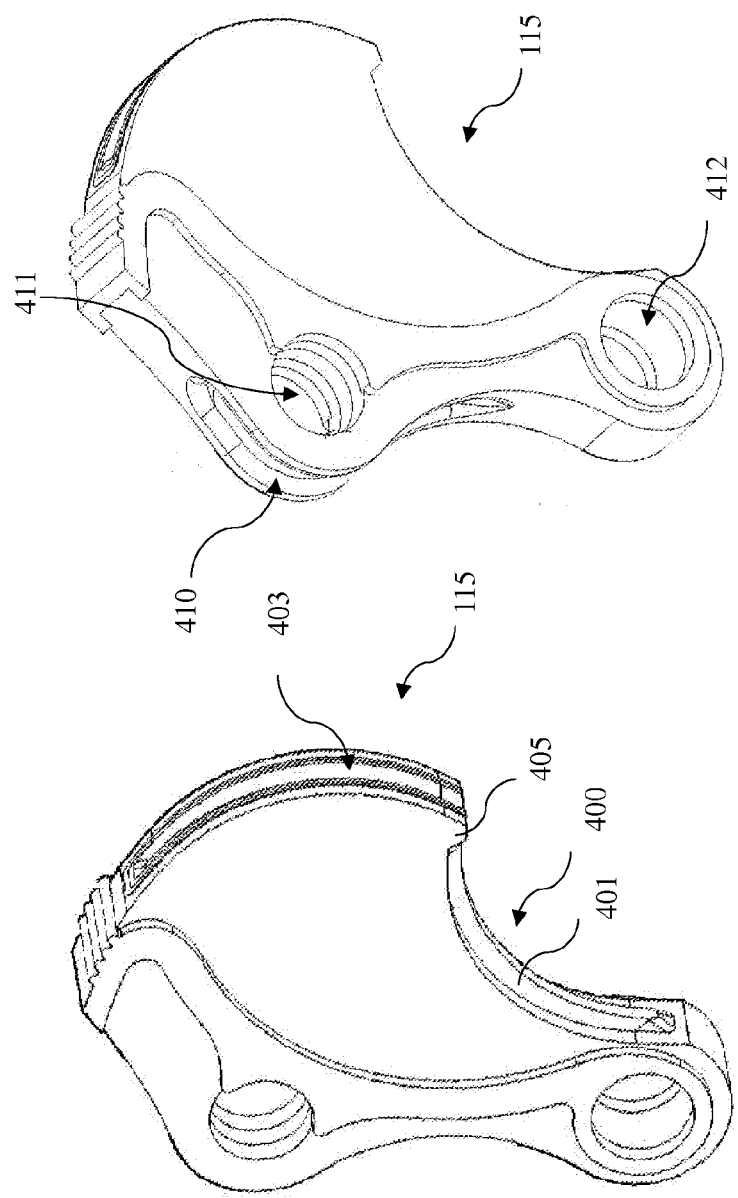
Figure 4B
Figure 4A

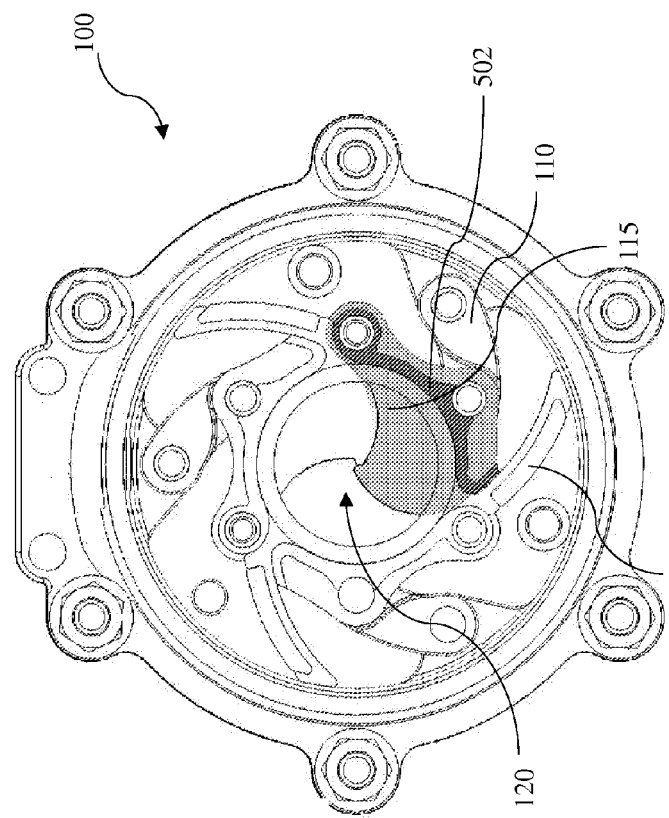
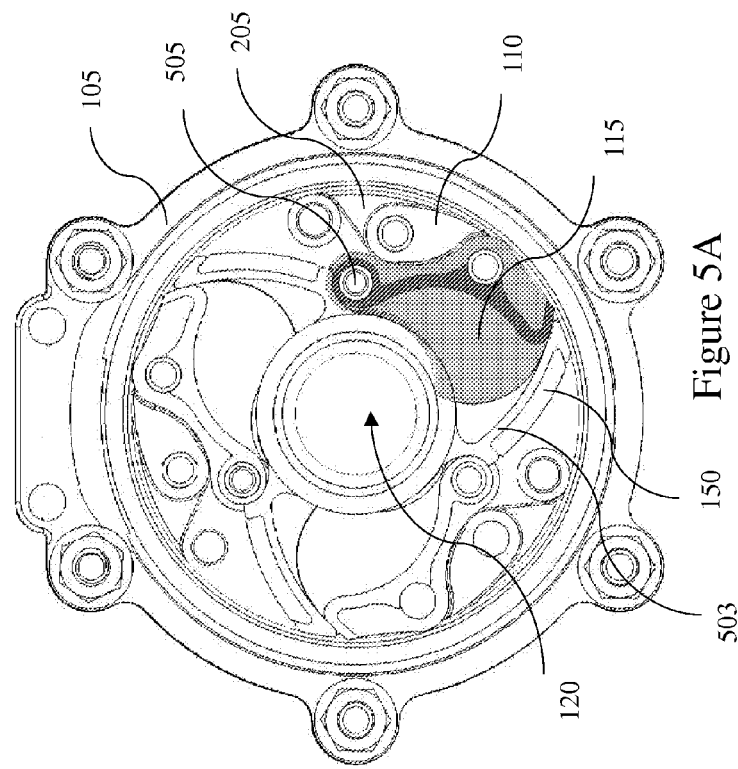

SHUTTER VALVE WITH PIVOT ARMS

CROSS-REFERENCE TO RELATED APPLICATIONS

This patent application is a continuation in part of utility patent application Ser. No. 14/454,265 filed Aug. 7, 2014 and entitled "Shutter Valve," which claims priority to provisional patent application No. 61/863,179 filed Aug. 7, 2013 and entitled "Shutter Valve." The subject matter of provisional patent application No. 61/863,179 and utility patent application Ser. No. 14/454,265 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of valve systems, and more particularly relates to the field of shutter valves for pressure regulation and the control of fluids in machines.

BACKGROUND OF THE INVENTION

One of the problems with conventional valves is the lack of the ability to regulate the amount of fluid flow through the valve. This is because most conventional valves typically only offer an on and off position. Completely stopping fluid flow, i.e., turning the valve to the off position, results in a steep pressure drop, which can cause a shockwave in the system and can result in cavitation. This can reduce the lifespan of the valve, as well as the system as a whole. Another problem with conventional valves is the lack of the ability to remain securely sealed in a pressurized system. This insecurity in said processes can cause leakage. Yet another common problem with conventional valves is that the obturator element remains within the lumen of the flow of gas or liquid, as with a butterfly valve, thereby interrupting fluid flow. This approach creates a disruption in the fluid flow and can cause potential currents that can produce cavitation. This negative result can also directly reduce the life span of a valve, pipe, or the entire system altogether. Yet another common problem with the conventional valves is that they include cavities and pockets that may be flooded with the fluids or gases that pass through the lumen. This can pose a problem when dealing with fluids that are considered foodstuffs, because foodstuff that is caught in small pockets can rot or otherwise decay, thereby causing contamination. Furthermore, valves used in foodstuff applications must be cleaned regularly. Therefore, the presence of cavities or pockets that collect foodstuffs can make it difficult to clean the valve.

One possible approach to the above-described problems is the use of an iris valve, which utilizes obturator elements within the lumen of the flow area, wherein the obturator elements open and close in an annular array to regulate the flow of gases or liquids. This removes all obstructions to the flow of gases and liquids when the valve is in the open position. But conventional iris valves also possess the same problem with remaining securely sealed, especially in a pressurized system. Thus, many conventional iris valves suffer from leakage caused by the inability to seal properly. The inability of conventional iris valves to seal properly has limited the uses and useful life span of the iris valve. In many cases, various industries have not used iris valves because of this problem.

Consequently, a need exists to overcome the problems with the prior art as discussed above, and particularly for a more efficient valve that seals properly.

SUMMARY OF THE INVENTION

Briefly, according to an embodiment of the present invention, disclosed is a shutter valve for regulating pressure and controlling fluid flow comprising an actuator ring, the actuator ring further includes a plurality of gear teeth driven by a mating gear or by some other means. The shutter valve also includes a plurality of arm pin bosses, each pin boss affixed within an inside circumference of the actuator ring, the arm pin boss further comprising a hinge pin aperture. The shutter valve further includes three or more pivot arms, each pivot arm includes a first end and a second end, the first end being mounted to a hinge pin aperture of an arm pin boss. The shutter valve further includes three or more obturator elements. Each obturator element includes: a) a petal shape structure including a tongue and groove feature along at least a portion of an outside circumference thereof; b) a hook element located at an apex of said petal shape structure of each obturator element; and c) a hinged connection to a second end of a pivot arm. The shutter valve further includes a housing defining a cavity for holding the actuator ring, the pivot arms and the obturator elements.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

FIGS. 4A and 4B are perspective views of an obturator element, in accordance with one embodiment.

FIG. 4C is a cross-sectional view of two mating obturator elements of the shutter valve, in accordance with one embodiment.

FIG. 5A is a front view of the shutter valve in an open position with the second part of the housing removed, in accordance with one embodiment.

FIG. 5B is a front view of the shutter valve in a closed position with the second part of the housing removed, in accordance with one embodiment.

DETAILED DESCRIPTION

Figure 1A:
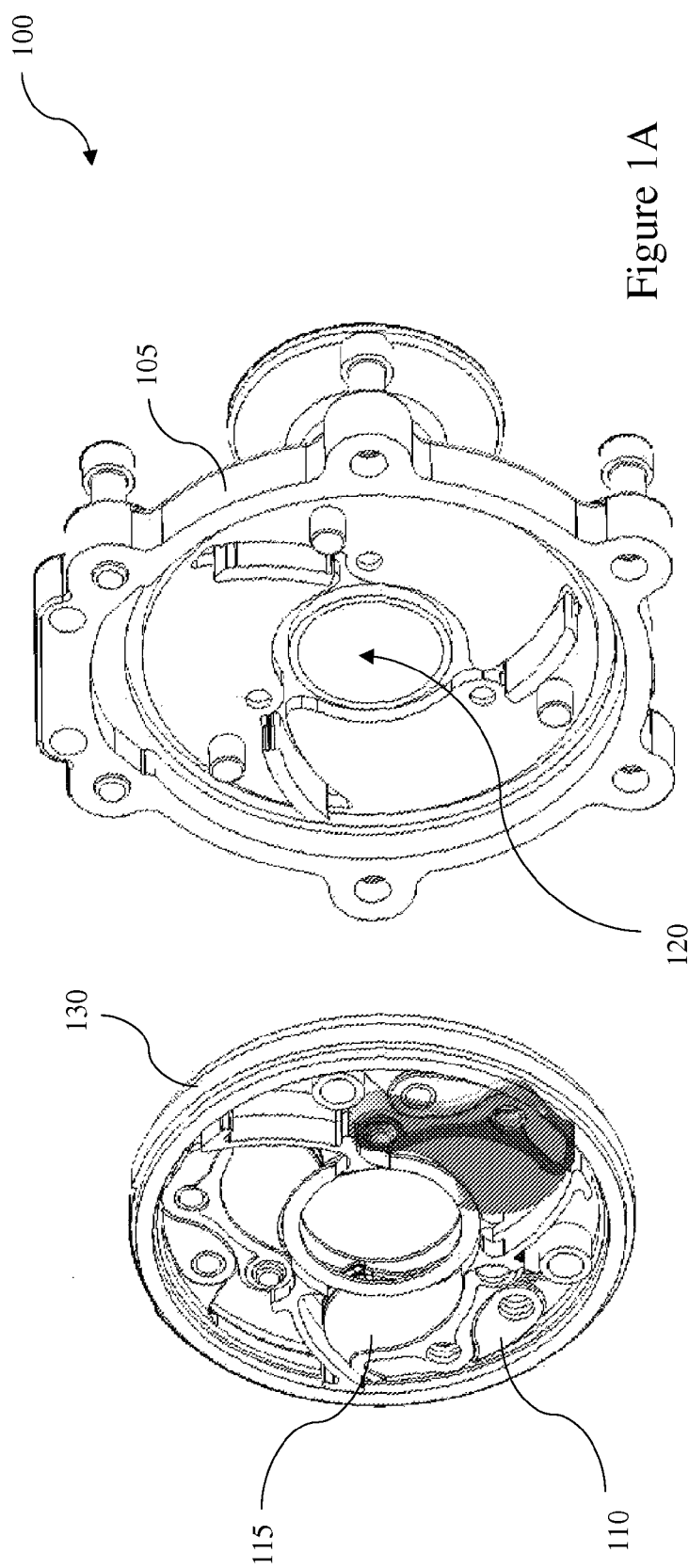
FIG. 1A is an exploded perspective view of the shutter valve without the second part of the housing, according to one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The disclosed embodiments solve problems with the prior art by providing a simplified shutter valve that allows for pressure regulation and for controlling the amount of fluid flow through the valve by regulating the aperture through which said fluid may flow. The disclosed embodiments further improve over the prior art by providing a system that allows for adjusting the lumen through which fluid flows. This allows a user to choose a desired size of the lumen, so as to regulate pressure and fluid flow through the valve. The disclosed embodiments further improve over the prior art by providing a system that allows for closure of the valve by progressively making the lumen through which fluid flows smaller until there is no aperture for allowing fluid flow, thereby eliminating a steep pressure drop, shockwaves in the system and cavitation. The disclosed embodiments also improve over the prior art by providing the ability to remain securely sealed throughout various types of processes. The disclosed embodiments further improve over the prior art by allowing the fluid to pass through the valve unobstructed when in the open position.

The disclosed embodiments further improve over the prior art by reducing or eliminating cavities and crevices in the valve that may be flooded with the fluids or gases that pass through the lumen. This eliminates the possibility of foodstuff, debris, or other substances being caught in small pockets that can then rot or otherwise prevent sterilization. Furthermore, this simplifies the process of cleaning said valves, when used in foodstuff applications, which require regular cleaning.

FIG. 1A is an exploded perspective view of the shutter valve 100 without the second part of the housing (shown in FIG. 1C below), according to one embodiment. The shutter valve 100 includes a housing having a first part 105 and a second part 107 (not shown in FIG. 1A), which is more specifically illustrated in FIGS. 1B and 1C and explained below. The housing further defines a central aperture 120. The central aperture is defined by a circular shaped opening deposited centrally on both flat surfaces of the housing. The parts of the housing 105, 107 define a cavity and cover that hold an actuator ring 130. In one embodiment (shown in FIG. 2B), the actuator ring comprises a plurality of gear teeth placed on a bevel gear. The gear teeth can be driven by a mating gear (not shown) or any other means of generating rotational energy to cause the actuator ring to translate or rotate the actuator ring within the housing of the shutter valve. Additionally, in other embodiments (not shown), the actuator ring can be driven by an appropriate means such as gears, belts, a shaft or some other apparatus to generate rotational energy required to move the actuator ring, and, by extension, the obturator elements.

Pivotally coupled to the actuator ring are three pivot arms 110, which is further described below (see description for FIG. 3). Hingedly mounted to the pivot arm are three obturator elements 115, which are more fully described below (see description for FIG. 3). See FIG. 2C for a description of how the pivot arm is coupled to the actuator ring and obturator element. The three obturator elements are arranged in a circular array along an inside circumference of the actuator ring. It should be noted that more than three obturator elements can be used. The three obturator elements are communally disposable between an open position and a closed position. In FIG. 1A, the elements are disposed in an open position. In the open position, the obturator elements are positioned within the inner circumference of the actuator ring such that fluids, solids, or mixtures thereof pass through the central aperture 120 of the valve 100.

Figure 1B:
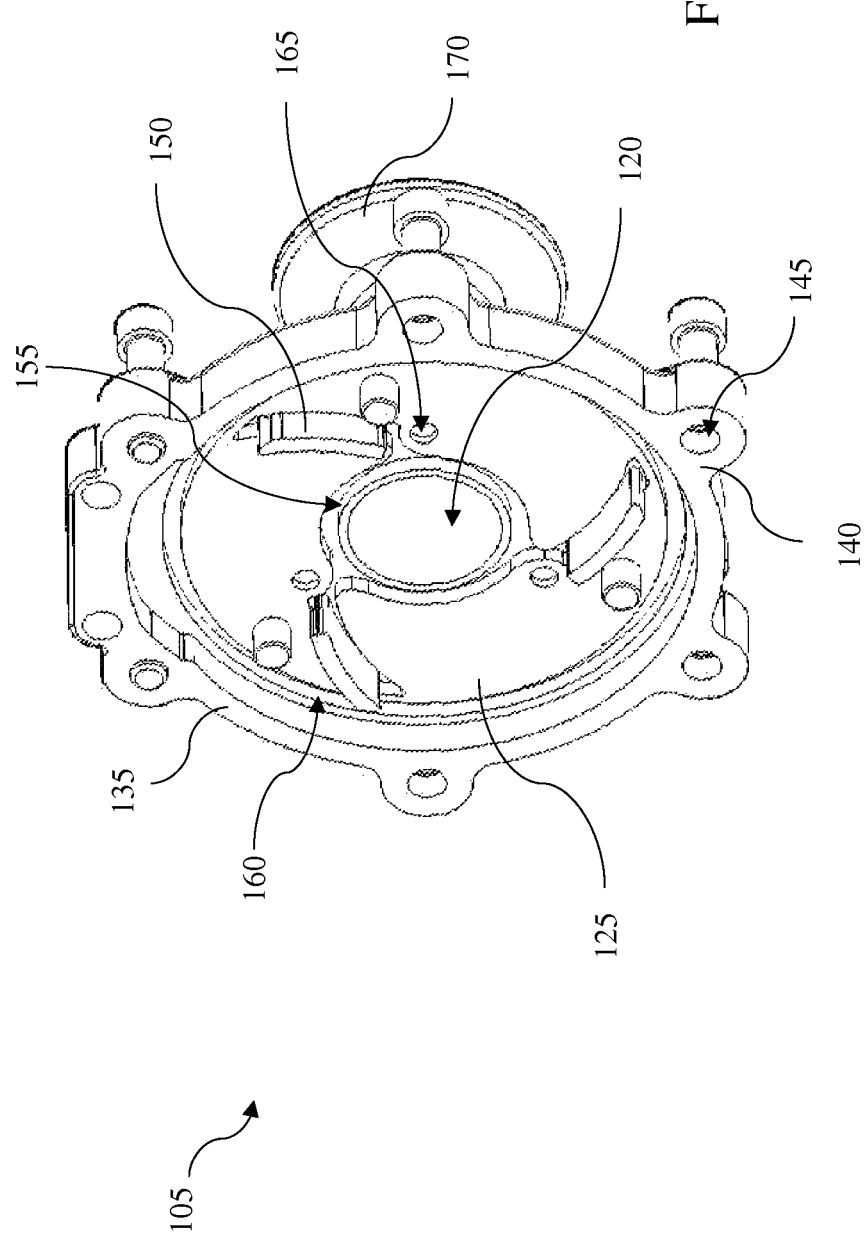
FIG. 1B is a perspective view of a first part of the shutter valve housing, according to one embodiment.

FIG. 1B is a perspective view of the first part 105 of the shutter valve housing, according to one embodiment. The first part defines a substantially flat circular body having a flat surface 125 surrounded by a rim or lip 135. The rim or lip protrudes substantially from the flat surface such that the lip extends perpendicularly outward from the flat surface. The rim surrounding the flat surface defines a cavity for holding the actuator ring 130, which is more specifically illustrated in FIG. 2A and described below. The cavity further holds the pivot arms and the obturator elements. The rim may be integral with the flat surface or the flat surface and rim may be manufactured separately and then coupled together. Along the edge of the rim is a plurality of screw or bolt bosses 140 having apertures 145 for receiving screws or bolts for joining or coupling the first part 105 with the second part 107 of the housing.

Along the surface 125 are three walled protrusions 150. These walled protrusions provide a surface against which a side surface of each obturator element slides when the obturator elements move. The walled protrusions define a curved and substantially rectangular shaped bar protruding substantially perpendicularly outward from the flat surface 125. The purpose of the walled protrusions 150 is to guide the movement of the obturator elements when they move within the housing. The first part of the housing further defines a circular shaped aperture that is centrally located on the surface 125 defining central aperture 120. Surrounding the central aperture can be an inner channel 155 forming a ring surrounding the central aperture 120 and further having three elongated curved shaped grooves extending radially outward from the ring. The inner channel defines two opposing side walls that are parallel to one another and are located below the surface 125. Additionally, an outer channel 160 may be proximate to the inside of the rim along the surface 125. The outer channel forms a ring proximate to the edge of the surface 125. The outer channel is defined by two opposing walls that are parallel to one another and wherein the walls are located below the surface 125.

O-rings and seals, not shown, can be inserted into the inner and outer channels 155, 160. The surface 125 may further include circular shaped cutouts 165. These cutouts may be used to receive a pin, bolt or other pivotal fastener that allows each of the obturator elements to be pivotally attached to the surface of the housing. Additionally, the first part 105 may also include a flange 170 that allows the shutter valve to be connected to other apparatuses or devices. In one embodiment, the body element can define a tubular shape body, wherein a channel defined by the body is in communication with the central aperture 120.

Figure 1C:
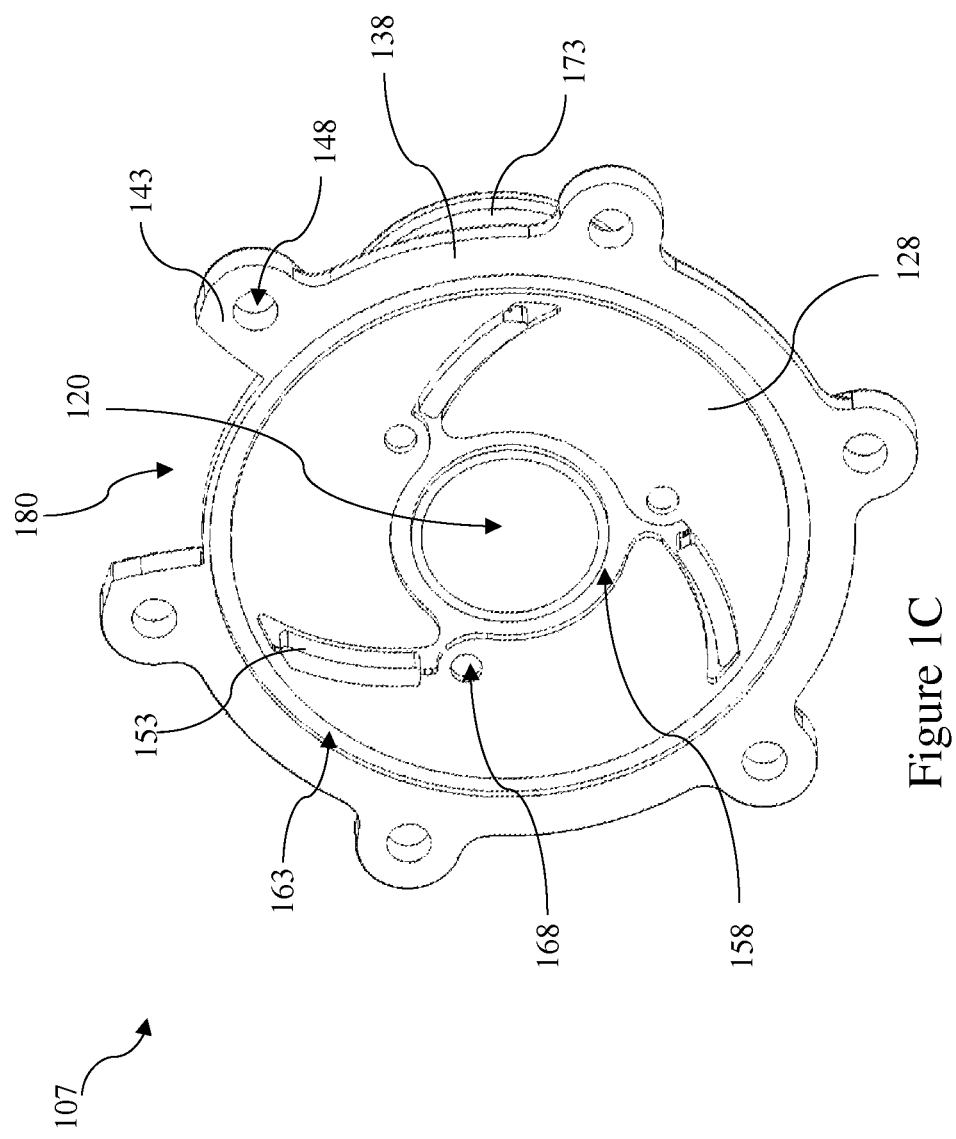
FIG. 1C is a perspective view of a second part of the shutter valve housing, according to one embodiment.

FIG. 1C is a perspective view of the second part 107 of the shutter valve housing, according to one embodiment. The second part is designed to mate with or cover the first part 105 of the housing, which define a cavity for holding the actuator ring 130, obturator elements, seals and pivot arms. The second part 107 also defines a substantially flat circular body having a flat surface 128. Along the edge of the flat surface 128 are plurality of screw or bolt bosses 143 having apertures 148 for receiving screws, bolts or other fasteners for joining or coupling the first part 105 with the second part 107. In the present embodiment, the screw bosses are not positioned on a rim. However, in other embodiments (not shown), both the first part and the second part may include a rim for defining a cavity in which the actuator ring, obturator elements and pivot arms. Along the surface 128 are three walled protrusions 153. In other embodiments, not shown, additional wall protrusions corresponding to the number of obturator elements may be used. The wall protrusions provide a surface against which a side surface of each obturator element slides when each obturator element moves. The purpose of the walled protrusions 153 is to guide the movement of the obturator elements when they move within the housing. A flat surface 138 surrounds the second part 107, which provides a surface against which first part 105 is mated. Flat surface 138 may mate with a seal, such that when part 105 of the housing is mated with part 107, a seal is included between the parts 105, 107 to seal the interior cavity created by housing 105, 107.

Each of the walled protrusions defines a curved and substantially rectangular shaped bar protruding substantially perpendicular outward from the flat surface 128. The second part of the housing further defines an aperture centrally located on the surface 128 defining central aperture 120. Surrounding the central aperture can be an inner channel 158 forming a ring surrounding the central aperture 120 and further having three elongated curved shaped grooves extending radially outward from the ring. The inner channel defines two opposing side walls that are parallel to one another and are located below the surface 128. Additionally, an outer channel 163 forms a ring that is proximate to and inside from the edge of the surface 128. The outer channel is defined by two opposing walls that are parallel to one another and wherein the walls are located below the surface 128. O-rings and seals, not shown, are inserted into the inner and outer channels 158, 163. The surface 128 may further include circular shaped cutouts 168. These cutouts may be used to receive a pin or bolt that allows each of the obturator elements to be pivotally attached to the surface of the housing. Additionally, the second part 105 may also include a body element 173 that allows the shutter valve to be connected to other apparatuses and devices. In one embodiment, the body element can define a tubular shape body, wherein a channel defined by the body is in communication with the central aperture 120. The first body may also include a slot 180 along the edge of surface 128 body for receiving a mating gear, or any other means of generating rotational energy to cause the actuator ring to translate within the housing of the shutter valve.

Figure 2A:
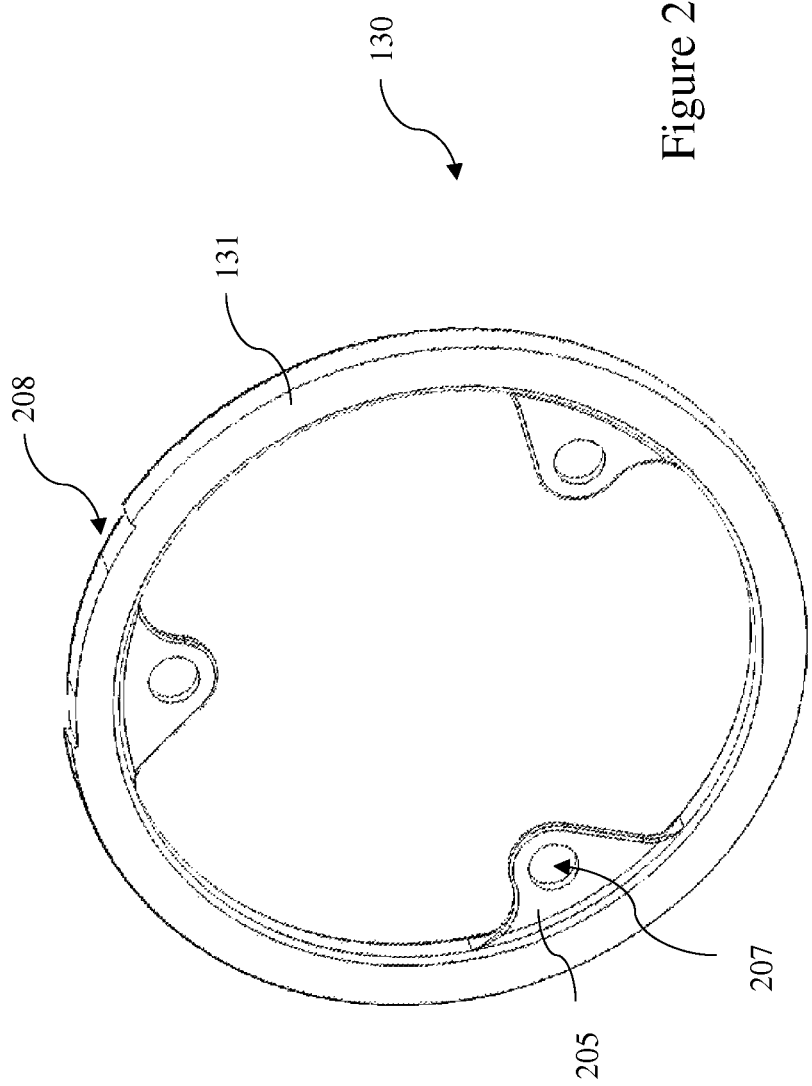
FIG. 2A is a perspective view of an actuator ring, in accordance with one embodiment.

FIG. 2A is a front view of the actuator ring 130, in accordance with one embodiment. The actuator ring defines a substantially circular shaped ring having a flat top surface opposing a flat bottom surface and a flat side wall. Additionally, the actuator ring includes a flat outwardly facing surface 131 for mating with a seal, which may be manufactured with high precision so that it forms a seal with other components of the shutter valve. The actuator ring may be formed from any material suitable and know to those skilled in the art. Additionally, the actuator ring may also include a flat sealing surface with a flat texture, wherein the sealing surface comprises of an appropriate sealing material. The actuator ring is sized to fit inside the cavity defined by the housing of the shutter valve.

The actuator ring includes three arm pin bosses 205 affixed within an inside circumference of the actuator ring. However additional arm pin bosses may be used when necessary if more than three obturator elements are used. The inside circumference is defined by the inner sidewall of the actuator ring. In the present embodiment, each arm pin boss defines a substantially planar triangular shaped protrusion extending radially inward from the inside side-wall of the actuator ring. Near an apex of each arm pin boss is a hinge pin aperture 207. Each hinge pin aperture 207 defines a circular shape and is adapted to receive a pin or other fastener that allows each pivot arm 110 to be hingedly connected or to have a hinged connection to each arm pin boss 205. Each arm pin boss is sized to be received by the slot 315 of each pivot arm, and as more specifically illustrated in FIG. 3 and described below.

Figure 2B:
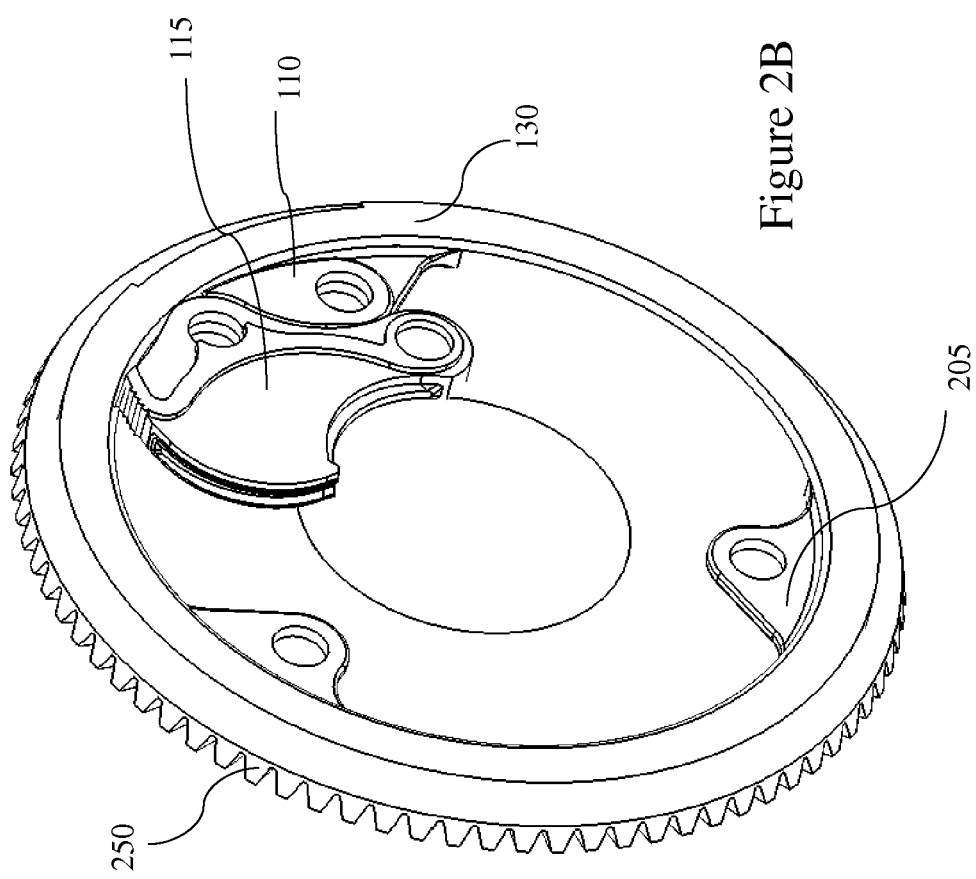
FIG. 2B is a perspective view of an actuator ring and bevel gear, in accordance with one embodiment.

FIG. 2B is a perspective view of an actuator ring and bevel gear, in accordance with one embodiment. FIG. 2B shows bevel gear 250, actuator ring 130 and components held within the inside circumference of the actuator ring, according to one embodiment of the present invention. In FIG. 2B the shutter valve is in an open position. A bevel gear having a plurality of gear teeth is adjacent to the actuator ring. The bevel gear may be integral with the actuator ring or it may be coupled or affixed to the actuator ring by welding, fasteners, etc. In another embodiment, not shown, the gear teeth may be integral with the actuator ring. The bevel gear provides gear teeth that can be driven by a mating gear (not shown) or any other means of generating rotational energy to cause the actuator ring to translate within the cavity of the housing.

Figure 2C:
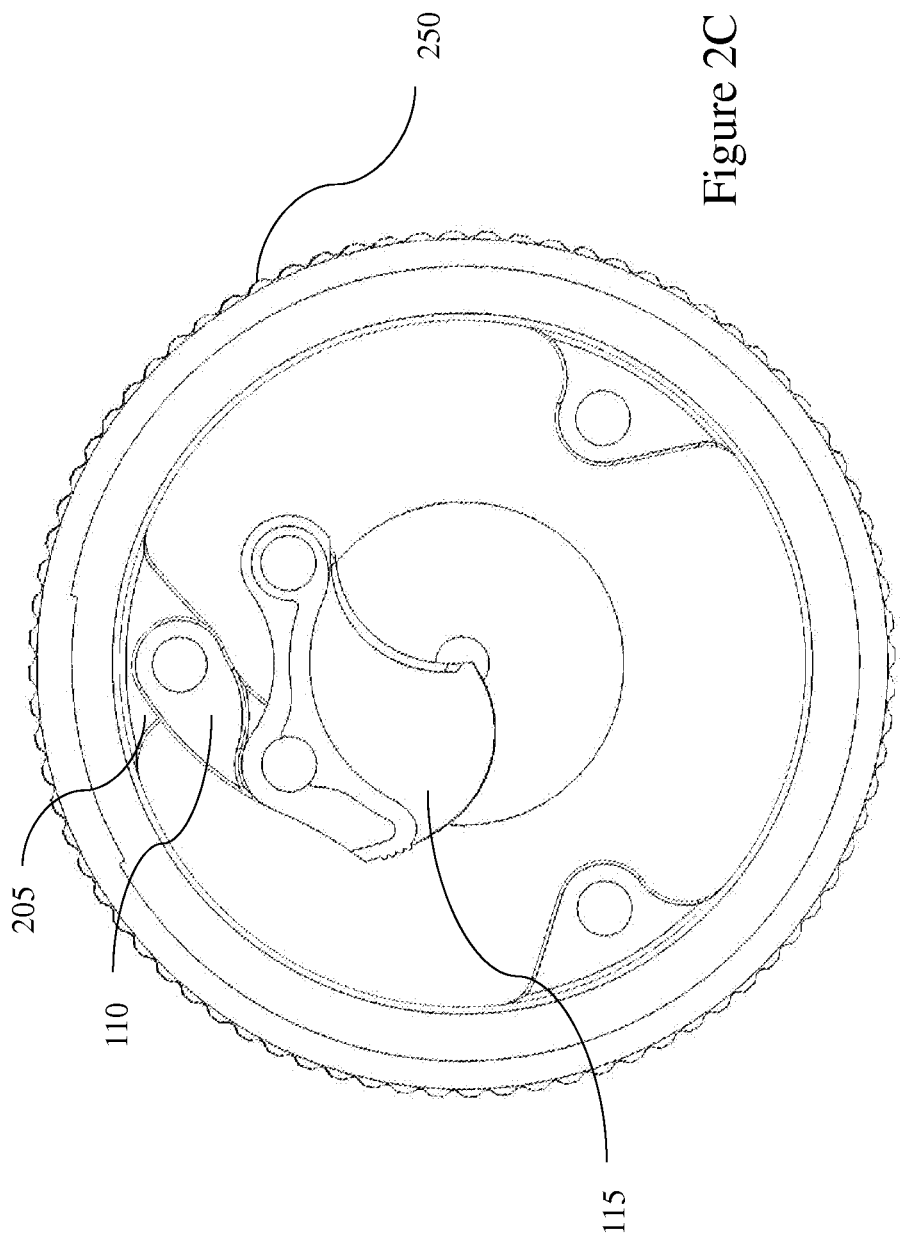
FIG. 2C is a perspective view of an actuator ring with a pivot arm and obturator element, in accordance with one embodiment.

Also shown in FIG. 2B, for exemplary purposes only, one sole pivot arm 110 and obturator element 115 in a retracted position is illustrated. The pivot arm and obturator element are in a retracted position when the shutter valve is in an open position. The obturator element is pivotally mounted to the pivot arm, which is pivotally mounted to the pivot arm boss of the actuator ring. In the open position, substantially all portions of the obturator elements do not block the central aperture. The shutter valve moves from the open to the closed position by applying forces tangential to the actuator ring. FIG. 2C illustrates the shutter valve in the closed position with substantial portions of one of the three obturator elements partially blocking the central aperture. When forces tangential to the actuator ring are applied to the gear teeth of the bevel, the actuator ring is rotated within the cavity of the housing. This causes the pivot arm to rotate, which causes the obturator element to pivot forcing the tongue and groove element of the obturator element into the central aperture.

Figure 3:
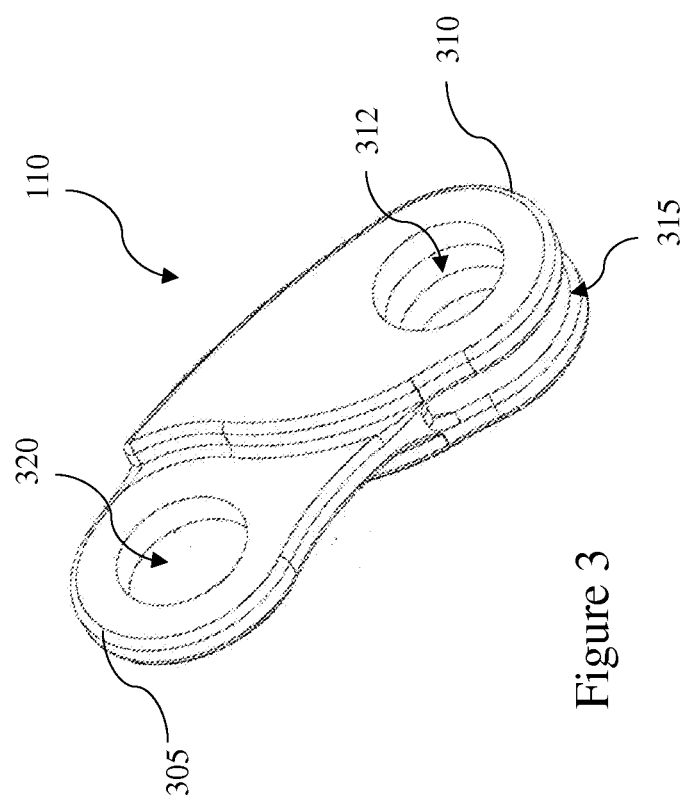
FIG. 3 is a perspective view of a pivot arm, in accordance with one embodiment.

FIG. 3 is a perspective view of the pivot arm 110, in accordance with one embodiment. The pivot arm defines a body having a first end 310 opposing a second end 305. The first end further defines a slot 315 formed by two opposing pivot arm side walls. Each slot is sized and adapted to receive the apex of arm pin boss 205. Each of the pivot arm side walls has a pair of matching circular openings defining a pivot arm channel 312. The pivot arm channel 312 is adapted to receive a fastener to hingedly or pivotally mount the first end of the hinge arm to the hinge pin aperture of the arm pin boss. The second end of the hinge arm comprises a circular pivot arm aperture 320. The second end of the pivot arm is adapted to be received by the obturator slot 310 on a portion of the outside circumference of each obturator element (see FIGS. 4A-4B).

FIGS. 4A and 4B are perspective views of an obturator element 115 of the shutter valve, in accordance with one embodiment. Each obturator element defines a petal shaped structure having a shape defined by a plurality of sides. In one embodiment, each of the obturator elements are equally sized and shaped, but this is not meant to be a limitation. Each obturator element further defines a tongue and groove feature 400 along at least a portion of the outside circumference of the petal shape structure. In the present embodiment, the tongue and groove feature is deposited on two (2) sides of the circumference, but this is not meant to be a limitation. In the present embodiment, on one side of the circumference, a tongue 401 of the tongue and groove feature 400 is located. The tongue can be a ridge protruding from the surface of the petal shaped structure that is adapted to fit into the groove 403 of an adjacent obturator element. On a second side of the circumference, a groove 403 of the tongue and groove feature 400 is located. Each groove is a channel defined by two opposing sidewalls and is located on a second side of the outside circumference. The surface of the circumference where the groove 403 is located defines the side surface of the obturator element, which side surface slides along the walled protrusions 150, 153 of the cavity made by the housing. The tongue and groove feature further comprises a seal surface comprising of any suitable seal material. The tongue and groove element and seal surface is adapted to create a seal between the obturator elements. The obturator element can be manufactured from any suitable rigid material known to those skilled in the art.

Each obturator element further defines an obturator slot 410 on a third side of the outside circumference thereof. Slot 410 is formed by two opposing side walls. The obturator slot provides a hinged connection to the second end of the pivot arm. The obturator slot is sized and adapted to receive a corresponding second end of a pivot arm, such that the second end of the pivot arm is inserted into the obturator slot of the obturator element. Each of the slot 410 side walls has a pair of matching circular openings defining an obturator channel 411. As a result, the obturator channel 411 and aperture 320 of the second end of the pivot arm align allowing a pivotal fastener or pin to pivotally couple the obturator element and pivot arm together.

The petal shape structure of each obturator element further defines a hook element 405 located at an apex of the petal shape structure. The hook element defines a hook or beak shape of the petal structure and is adapted to mate with the hook elements of other obturator elements when the valve is in a closed position. See FIG. 5B, which shows all obturator elements 115 in the closed position, and the hook features of all obturator elements mating with each other to completely occlude the lumen 120 and eliminating fluid flow through the lumen 120.

Each obturator element further defines a circular obturator channel 412 that is adapted to receive a pin or pivotal fastener for pivotally mounting the obturator element to within the cavity formed by the first and second parts of the housing. A pin or shaft can be inserted into the circular obturator channel 412 and into the circular shaped cutouts 165 and 168 of the first and second parts of the housing to pivotally mount each obturator element to the housing.

FIG. 4C is a cross-sectional view of two mating obturator elements of the shutter valve 100, in accordance with one embodiment. FIG. 4C shows that each obturator element defines a tongue and groove feature 400 along at least a portion of the outside circumference of the petal shape structure. In the top obturator element 480, a tongue 401 of the tongue and groove feature 400 is located. The tongue can be a ridge protruding from the surface of the petal shaped structure that is adapted to fit into the groove 403 of an adjacent obturator element 481. The groove 403 is a channel defined by two opposing sidewalls, wherein the groove is designed to accept the tongue 401 of the adjacent obturator element 480 (when the valve 100 is in the closed position—see FIG. 5B) so as to create a seal. The tongue and groove feature 400 further comprises a seal surface 421 comprising of rubber, plastic, PTFE, vinyl, any combination thereof etc. The tongue and groove element and seal surface is adapted to create a seal between the obturator elements 480, 481.

FIG. 5A is a frontal view of the shutter valve in a fully open position with the second part 107 of the housing removed, in accordance with one embodiment. In the present embodiment, FIGS. 5A and 5B illustrate three obturator elements 115 hingedly coupled to the pivot arm 110 such that the obturator elements are arranged in a circular array around the inside circumference of the actuator ring 110. In other embodiments (not shown), more than three obturator elements can be used. FIG. 5A illustrates the shutter valve 100 in an open position and FIG. 5B illustrates the shutter valve in a fully closed position. The three or more elements are communally disposable between the open position and the closed position. Each of the obturator elements are movably or hingedly attached to the second end of the pivot arm by a fastener. In one embodiment, a fastener can be a pin, shaft or other means of allowing pivoting movement between two parts. As explained above, the pivot arm aperture of the second end of the pivot arm is adapted to be received by the slot 410 on a portion of the outside circumference of each obturator element. FIG. 3 illustrates how the slot of each pivot arm is adapted and sized to be received by the pivot arm boss 205.

FIGS. 5A and 5B also illustrate the plurality of elements 505 being received by the plurality of cutouts. The element 505 (which may be a shaft or pin, for example) is sized such that it can be inserted into the cutouts 165, 168 of the first and second parts of the housing to pivotally mount each obturator element to the cavity of the housing. Each element 505 can be integral with each obturator element or it can be coupled or affixed to each obturator element separately.

FIGS. 5A and 5B also illustrate walled protrusions 150 that define a curved and substantially rectangular shaped bar protruding substantially perpendicularly outward from the flat surface 125. The walled protrusions provide a surface against which the side surface of each obturator element can slide when the obturator elements move between the open and closed positions.

In the present embodiment, three obturator elements are communally disposable between an open position and a closed position. As shown in FIG. 5A, in the fully open position, each of the plurality of the obturator elements are positioned such that the central opening or aperture 120 is not obstructed allowing fluids, gases or bodies to flow through the opening. As forces act tangential to the actuator ring, the actuator ring rotates within the cavity defined by the housing. This causes each pivot arm to move the side surface of each obturator element against each of the walled protrusions causing each obturator element to slide or glide along each of the walled protrusions. The obturator elements will continue to slide along the walled protrusions 150, 153 until each of the obturator elements contact an adjacent obturator element so as to securely void any aperture within the inside circumference of the actuator ring. When in the fully closed position, the tongue 401 of each tongue and groove element 400 of each obturator element mates with the groove 403 of an adjacent obturator element (see FIG. 4C). Additionally, each hook element 405 of each obturator element contacts with the hook element of an adjacent obturator element forming a seal.

FIG. 5B illustrates the shutter valve in a closed position. To open the shutter valve from a closed position, tangential forces (opposite to those applied for closing the shutter valve) are applied to the actuator ring such that the actuator ring is rotated within the housing. This causes the pivot arm to pull each obturator element causing each obturator element to disengage from the adjacent obturator elements. As a result, the side surface of each obturator element slides or glides against the walled protrusions and away from the central aperture. As mentioned above, when in the fully open position, the central aperture 120 is not blocked by any portion of the obturator elements. The shutter valve can be positioned in a partially open or partially closed position for regulating pressure and for controlling fluid flow. Additionally, additional gaskets, O-rings or seals may also be utilized within the cavity to accomplish a fluid tight seal if required.

FIG. 5A also illustrates a plurality of wiper 502 and elongated elements 503. Each elongated element and wiper may be composed of seal material. Or, each elongated element and wiper may be composed of material more malleable than the material of which the obturator element is composed. A pair of wipers are disposed on a top surface and a bottom surface of each obturator element. When the valve is assembled, the wipers contact the flat surfaces 125, 128 of parts 105, 107 of the housing and consequently form a seal with the flat surfaces 125, 128. Thus, this creates a seal such that fluid cannot pass through the seal between the wipers and the flat surfaces 125, 128. This limits the travel of the fluid within the cavity created by the housing.

Further, in the present embodiment, three elongated elements 503 are disposed within the cavity. Each elongated element abuts each walled protrusion 150, 153 proximate to each obturator element. Each elongated element may be composed of seal material. When the valve is assembled, each elongated element contacts the flat surfaces 125, 128 of parts 105, 107 of the housing and consequently form a seal with the flat surfaces 125, 128. Thus, this creates a seal such that fluid cannot pass through the seal between the elongated elements and the flat surfaces 125, 128. This also limits the travel of the fluid within the cavity created by the housing.

When the shutter valve is in an open position (as in FIG. 5A), the wipers and elongated elements are positioned such that adjacent wipers and elongated elements contact one another to from an enclosed area. That is, in the open position, there is a perimeter defined by a chain of wipers and elongated elements, wherein the perimeter forms a seal beyond which fluid cannot pass. The enclosed area defined by the perimeter forms a seal preventing fluids or gases from entering into a portion of the cavity of housing. Thus, in the open position, the valve allows the fluid travelling through the lumen to stay within a small area of the cavity of the housing.

FIG. 5B illustrates the shutter valve in the closed position. When in the closed position, adjacent wipers and elongated elements contact one another to from a smaller enclosed area. That is, in the closed position, there is a smaller perimeter defined by a chain of wipers and elongated elements, wherein the smaller perimeter forms a seal beyond which fluid cannot pass. The smaller enclosed area forms a seal preventing fluids or gases from entering into a substantial portion of the cavity of housing. Said smaller perimeter is substantially the same as the circular area defined by the lumen 120. Thus, in the closed position, the valve only allows the fluid travelling through the lumen to stay within substantially the lumen and prevents it from entering into the cavity of the housing. When moving from the open position to the closed position, the valve expels any fluid located within the cavity of the housing into substantially the lumen area.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A shutter valve for regulating pressure and controlling fluid flow, comprising:
    an actuator ring, the actuator ring further comprising a plurality of gear teeth, the gear teeth driven by a mating gear;
    a plurality of arm pin bosses, each pin boss affixed within an inside circumference of the actuator ring, the arm pin boss further comprising a hinge pin aperture;
    three or more pivot arms, each pivot arm having a first end and a second end, the first end mounted to a hinge pin aperture of an arm pin boss;
    three or more obturator elements, each obturator element comprising:
        a) a petal shape structure including a tongue and groove feature along at least a portion of an outside circumference thereof;
        b) a hook element located at an apex of said petal shape structure of each obturator element; and
        c) a hinged connection to a second end of a pivot arm; and
    a housing defining a cavity for holding the actuator ring, the pivot arms and the obturator elements.

2. The shutter valve of claim 1, wherein the petal shape structure of each obturator element further comprises a seal surface along at least a portion of the outside circumference thereof.

3. The shutter valve of claim 2, wherein said seal surface of said tongue and groove feature is composed of any suitable seal material.

4. The shutter valve of claim 3, wherein said actuator ring comprises a flat sealing surface with a flat texture.

5. The shutter valve of claim 4, wherein the three or more obturator elements are arranged in a circular array along the inside circumference of the actuator ring.

6. The shutter valve of claim 5, wherein said three or more obturator elements are communally disposable between an open position and a closed position.

7. The shutter valve of claim 6, wherein in the closed position the seal surface of each obturator element contacts an adjacent obturator element so as to securely void any aperture within the inside circumference of the actuator ring.

8. The shutter valve of claim 7, wherein forces acting on the gear teeth drive the actuator ring, causing the obturator elements to move between the open and closed positions.

9. A shutter valve for regulating pressure and controlling fluid flow, comprising:
    an actuator ring, the actuator ring further comprising a plurality of gear teeth, the gear teeth driven by a mating gear;
    a plurality of arm pin bosses, each pin boss affixed within an inside circumference of the actuator ring, the arm pin boss further comprising a hinge pin aperture;
    three or more pivot arms, each pivot arm having a first end and a second end, the first end hingably mounted to a hinge pin aperture of an arm pin boss, such that rotational movement of the actuator ring causes movement of the pivot arms;

three or more obturator elements, each obturator element comprising:
  a) a petal shape structure including a locking feature along at least a portion of an outside circumference thereof;
  b) a hook element located at an apex of said petal shape structure of each obturator element;
  c) a hinged connection to a second end of a pivot arm, such that movement of the pivot arm causes movement of the corresponding obturator element; and
  d) a hinged connection to a housing; and a housing defining a cavity for holding the actuator ring, the pivot arms and the obturator elements, further comprising a plurality of hinge pin apertures for coupling to hinged connections to obturator elements.

10. The shutter valve of claim 9, wherein the petal shape structure of each obturator element further comprises a seal surface along at least a portion of the outside circumference thereof.

11. The shutter valve of claim 10, wherein said seal surface of said locking feature is composed of any suitable seal material.

12. The shutter valve of claim 11, wherein said actuator ring comprises a flat sealing surface with a flat texture.

13. The shutter valve of claim 12, wherein the three or more obturator elements are arranged in a circular array along the inside circumference of the actuator ring.

14. The shutter valve of claim 13, wherein said three or more obturator elements are communally disposable between an open position and a closed position.

15. The shutter valve of claim 14, wherein in the closed position the seal surface of each obturator element contacts an adjacent obturator element so as to securely void any aperture within the inside circumference of the actuator ring.

16. The shutter valve of claim 15, wherein forces acting on the gear teeth drive the actuator ring, causing the obturator elements to move between the open and closed positions.

17. A shutter valve for regulating pressure and controlling fluid flow, comprising:
  an actuator ring, the actuator ring further comprising a plurality of gear teeth, the gear teeth driven by a mating gear;
  a plurality of arm pin bosses, each pin boss affixed within an inside circumference of the actuator ring, the arm pin boss further comprising a hinge pin aperture;
  three or more pivot arms, each pivot arm having a first end and a second end, the first end hingably mounted to a hinge pin aperture of an arm pin boss, such that rotational movement of the actuator ring causes movement of the pivot arms;
  three or more obturator elements, each obturator element comprising:
    a) a petal shape structure including a locking feature along at least a portion of an outside circumference thereof;
    b) a hook element located at an apex of said petal shape structure of each obturator element;
    c) a hinged connection to a second end of a pivot arm, such that movement of the pivot arm causes movement of the corresponding obturator element; and
    d) a hinged connection to a housing; and
  a housing defining a cavity for holding the actuator ring, the pivot arms and the obturator elements, comprising:
    a) a plurality of hinge pin apertures for coupling to hinged connections to obturator elements; and
    b) a plurality of walled protrusions within said cavity, each walled protrusion providing a surface against which a primary surface of each obturator element slides when the obturator elements move.

18. The shutter valve of claim 17, wherein the petal shape structure of each obturator element further comprises a seal surface along at least a portion of the outside circumference thereof.

19. The shutter valve of claim 18, wherein said seal surface of said locking feature is composed of any suitable seal material.

\* \* \* \* \*